United States Patent [19]

Wang et al.

[11] Patent Number: 4,600,607

[45] Date of Patent: Jul. 15, 1986

[54] BONDING A SIALON COATING TO A SUBSTRATE

[75] Inventors: Ke-Chin Wang, Pittsburgh; Eugene T. Rushe, Port Vue; Howard M. Winkelbauer, McKeesport, all of Pa.

[73] Assignee: Dresser Industries, Inc., Dallas, Tex.

[21] Appl. No.: 690,280

[22] Filed: Jan. 10, 1985

[51] Int. Cl.⁴ ............................................. B05D 1/02
[52] U.S. Cl. .................................... 427/421; 106/84; 106/14.21
[58] Field of Search ................. 106/84, 14.11, 38.3, 106/287.34, 14.21; 427/419.2, 419.7, 421; 501/98

[56] References Cited

U.S. PATENT DOCUMENTS

| | | | |
|---|---|---|---|
| 3,903,230 | 9/1975 | Kamigaito | 264/122 |
| 3,951,667 | 4/1976 | Kogure et al. | 106/84 X |
| 3,991,166 | 11/1976 | Jack | 423/327 |
| 4,066,468 | 1/1978 | Kamigaito | 106/73.4 |
| 4,071,371 | 1/1978 | Milberg et al. | 106/65 |
| 4,147,759 | 4/1979 | Demit | 423/327 |
| 4,187,344 | 2/1980 | Fredriksson | 428/304 |
| 4,517,037 | 5/1985 | Francis et al. | 501/98 X |

FOREIGN PATENT DOCUMENTS 59-232974  12/1984  Japan ..................... 106/84

*Primary Examiner*—William R. Dixon, Jr.
*Assistant Examiner*—Steven Capella
*Attorney, Agent, or Firm*—John N. Hazelwood; Barry E. Deutsch

[57] ABSTRACT

A coating for a substrate includes a mix comprising sodium silicate, water and sialon powder. A defoaming agent is also added to the mix.

7 Claims, No Drawings

BONDING A SIALON COATING TO A SUBSTRATE

DESCRIPTION OF THE INVENTION

1. Technical Field

This invention concerns coating ceramics or metal substrates with a protective layer of sialon.

2. Background of the Invention

Sialon is a new ceramic material composed of the elements, silicon, aluminum, oxygen and nitrogen. Numerous patents, U.S. Pat. Nos. 3,903,230; 3,991,166; 4,066,468; 4,071,371; and 4,147,759 to name a few, testify to the highly desirable properties of this material. Sialon is noted for its chemical inertness, oxidation resistance, high strength, and sinterability. In many applications where a refractory of sialon's characteristics is needed, large pressed shapes are either unnecessary or prohibitive in cost. Because of this, it is desirable to apply a thin coat of sialon to a substrate in order to impart the properties of sialon to the article. However, in most initial work conducted with sialon, it involved formation of entire shapes from this material.

U.S. Pat. No. 4,187,344 describes a means of applying a silicon nitride or oxynitride to the surface of a silicon carbide heating element for the purpose of protecting the element from oxidation. The patent teaches a means of applying the slurry to the substrate, but the formulation has a fundamental drawback, i.e., it must be heated to 1000° C. to initiate bonding of the fine powder. Without this heat-induced sintering, the coating would lack strength.

Accordingly, it is an object of this invention to provide a means of applying and bonding sialon to a substrate at relatively low temperature levels. The coating of sialon will, in many metallurgical applications, provide a layer to protect the substrate from corrosive gases and fluxes.

SUMMARY OF THE INVENTION

This and other objects of the present invention are attained by preparing a slip and then spraying the slip onto the substrate or dipping the substrate into the slip. The slip contains a water glass which serves as the vehicle and sialon powder. Simple drying of the slip produces a tough durable glass which bonds the sialon to the substrate. Further heat treatment is unnecessary except for high temperature applications, such as, continuous casting where water vapor which could outgas from the coating must be avoided.

DESCRIPTION OF THE PREFERRED EMBODIMENT

The substrate to be coated is lightly sandblasted and then degreased. A slip is prepared by preblending 75 volume percent water and 25 volume percent sodium silicate. One and one-half grams powder (82%—325 mesh) are added to each ml of this solution. A conventional defoamer is blended with the slip to remove bubbles which could cause blistering of the coated surface. A slight amount of sodium hydroxide is also added to adjust the slip to a pH of 12. The slip may be sprayed onto the substrate or the substrate may be dipped into the slip.

EXAMPLE I

A vehicle was prepared by blending 82 volume percent water with 18 volume percent sodium silicate (40° Baume). To this solution, 1.4 gm of sialon powder (ground 82%—325 mesh) was added per ml of solution. A saturated solution of soapy water (0.1 volume percent) was then added to defoam the solution. Soapy water appeared to be an ineffective defoamer. A saturated NaOH solution (0.01 volume percent) was then added to the solution to adjust the pH to 12. The slip appeared to be too watery and tended to drip while spraying onto a fused silica substrate.

EXAMPLE II

The above formulation was repeated except the defoamer was Diamond Shamrock's PD #1 at the 0.13 weight percent level. This defoamer also appeared to be ineffective in this formulation. In addition, during spraying the slip tended to drip off a fused silica substrate.

Sialon coatings made with formulations described in Examples I and II could be rubbed off after drying at 250° F.

EXAMPLE III

Another formulation was prepared according to Example II, but with 1.5 grams of sialon powder added to the water glass. The higher level of loading provided improved spraying characteristics. In addition, 0.13 weight percent defoamer made by Calgon Corporation and sold under the trademark "HAGAN", was added to the mix. This defoamer proved to be effective.

EXAMPLE IV

To provide more glass development in the coating, slips were prepared with less water. A mix was prepared with 75 volume percent water and 25 volume percent sodium silicate (40° Baume). Sialon powder was added at a concentration of 1.5 gms/ml. HAGAN defoamer, in amounts as little as 0.03 weight percent, was effective in defoaming the mix. This mix also contained NaOH as a pH adjuster. The slip was sprayed onto a fused silica substrate.

EXAMPLE V

A slip was prepared with 65 volume percent water and 35 volume percent sodium silicate (40° Baume). Additives described in Examples IV were also added to this mix. This slip was also sprayed onto a fused silica substrate.

After drying in air, the coated substrates described in Examples IV and V were encased in glass and could not be rubbed off. After firing at 980° C. for 5 hours to fully eliminate any chemically bound water from the glass bond, the coatings described in Example IV showed crazing (miniature cracks and similar imperfections), whereas the coating described in Example V did not. In addition, the coating described in Example V in cut section view showed less than a 0.8 mm thick alkali reaction zone beneath the sialon coating. Microprobe examination indicated this reaction zone was caused by soda migration into the fused silica substrate and subsequent reaction. This reaction forms a soda rich silicate having an undesirably high thermal expansion when compared to sialon or fused silica and thus would be prone to peeling.

EXAMPLE VI

To narrow the acceptable range of alkali silicate to water, a mix was made with 70 volume percent water and 30 volume percent sodium silicate (40° Baume). The same mix additions as shown in Example V were also employed. After reheating at 980° C., cut section examination showed a deeper 6.4 mm thick alkali reaction zone. This suggested the optimum water to sodium silicate ratio for a fused silicate substrate lies between 70:30 to 80:20 (2.3:1 to 4:1). If firing temperatures lower than 980° C. are used to outgas water vapor from the bond, then this range could be extended.

While a preferred embodiment of the present invention has been described and illustrated, the invention should not be limited thereto, but may be otherwise embodied within the scope of the following claims.

The embodiments of the invention in which an exclusive property or privilege is claimed are defined as follows:

1. A coating for a refractory substrate comprising a slip formed from water, sodium silicate, and sialon powder, with the ratio of water to sodium silicate, on a volume percent basis, ranging from 2.3:1 to 4:1, and further including 0.01 to 0.15 weight percent defoaming agent.

2. A coating in accordance with claim 1 wherein the sialon powder was added at a concentration of 1.5 gms/ml of the mixture of water and sodium silicate.

3. A method of forming a coating for a substrate comprising the steps of:
   preparing a mix comprising water and sodium silicate;
   adding sialon powder to the mix;
   adding a relatively small amount of defoamer to said mix; and
   spraying the mix onto the substrate to form a coating thereon.

4. A method in accordance with claim 3 wherein the ratio of water to sodium silicate on a volume percent basis varies between 2.3:1 to 4:1.

5. A method in accordance with claim 4 wherein the defoaming agent added to the mixture on a weight percentage basis of the mix comprises 0.03 to 0.15.

6. A method in accordance with claim 5 wherein the concentration of sialon powder added to the mix is 1.5 gms/ml.

7. A method in accordance with claim 3 wherein the concentration of sialon powder added to the mix is 1.5 gms/ml.

* * * * *